(12) United States Patent
Bruce et al.

(10) Patent No.: US 8,757,674 B2
(45) Date of Patent: *Jun. 24, 2014

(54) SYSTEM, METHOD AND APPARATUS FOR DOOR LATCHING USING A SPRING LATCH

(75) Inventors: Brian Bruce, Austin, TX (US); Ahmad Chamseddine, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/486,792

(22) Filed: Jun. 1, 2012

(65) Prior Publication Data

US 2012/0274192 A1 Nov. 1, 2012

Related U.S. Application Data

(63) Continuation of application No. 12/204,613, filed on Sep. 4, 2008, now Pat. No. 8,226,131.

(60) Provisional application No. 60/967,420, filed on Sep. 4, 2007.

(51) Int. Cl.
*E05C 1/02* (2006.01)
*E05C 1/08* (2006.01)

(52) U.S. Cl.
USPC .... 292/163; 292/137; 292/169; 292/DIG. 11; 292/DIG. 63

(58) Field of Classification Search
USPC .................... 292/137, 169, DIG. 11, DIG. 63
See application file for complete search history.

(56) References Cited

U.S. PATENT DOCUMENTS

| 2,033,295 | A | | 3/1936 | Parkin |
| 2,069,177 | A | | 1/1937 | Craver |
| 2,478,434 | A | | 8/1949 | Swanson |
| 2,936,189 | A | | 5/1960 | Knapp |
| 2,954,264 | A | | 9/1960 | Tisch et al. |
| 3,090,643 | A | | 5/1963 | Barnes, Sr. |
| 3,129,964 | A | | 4/1964 | McNeil |
| 3,164,289 | A | | 1/1965 | Cocchiarella |
| 3,170,701 | A | | 2/1965 | Hoover |
| 3,294,274 | A | | 12/1966 | Spitzberg |
| 3,666,338 | A | | 5/1972 | Russell |
| 3,804,026 | A | * | 4/1974 | McNally .................. 105/377.11 |

(Continued)

OTHER PUBLICATIONS

Office Action for U.S. Appl. No. 12/204,613, mailed Sep. 28, 2011, 10 pgs.

(Continued)

*Primary Examiner* — Carlos Lugo
(74) *Attorney, Agent, or Firm* — Larson Newman, LLP (57) ABSTRACT

A system for preventing ingress of liquid into an opening in a computer casing may include a door rotatably connected to the computer casing, a layer of material adhered to the door and having a chamfered edge, a bar movably connected to the computer casing and operable for travel in a first direction or a second direction opposite the first direction and a spring having a first end connected to the bar and a second end connected to the computer casing for biasing the bar in the first direction of travel. Closing the door causes the layer of material to contact a recessed surface of the opening and deflect the chamfered edge to form a seal in the recessed opening. Moving the bar in the first direction retains the door relative to the computer to maintain the seal formed by the layer of material.

15 Claims, 10 Drawing Sheets

(56) References Cited

U.S. PATENT DOCUMENTS

| | | | |
|---|---|---|---|
| 3,907,349 A * | 9/1975 | Kane | 292/256.67 |
| 4,186,525 A | 2/1980 | Carvalho | |
| 4,311,317 A | 1/1982 | Bartels | |
| 5,050,764 A | 9/1991 | Voss | |
| 5,331,506 A | 7/1994 | Nakajima | |
| 5,626,374 A | 5/1997 | Kim | |
| 5,678,827 A | 10/1997 | Burian et al. | |
| 5,687,997 A | 11/1997 | Beacom | |
| 5,845,803 A | 12/1998 | Saito et al. | |
| 6,134,116 A | 10/2000 | Hoss et al. | |
| 6,762,928 B2 | 7/2004 | Lo | |
| 6,860,530 B2 * | 3/2005 | Senn | 292/285 |
| 6,919,510 B1 | 7/2005 | Chen | |
| 7,088,588 B2 | 8/2006 | Lee | |
| 7,108,135 B2 | 9/2006 | Park | |
| 7,375,279 B2 | 5/2008 | Chen | |
| 7,410,194 B2 | 8/2008 | Chen et al. | |
| 7,413,099 B2 | 8/2008 | Takahashi et al. | |
| 7,742,294 B2 | 6/2010 | Gadau et al. | |
| 8,226,131 B1 | 7/2012 | Bruce et al. | |
| 2003/0024936 A1 | 2/2003 | Niese | |
| 2009/0256364 A1 | 10/2009 | Gadau et al. | |
| 2009/0260294 A1 | 10/2009 | Sullivan | |
| 2010/0147846 A1 | 6/2010 | Soibel et al. | |
| 2010/0206601 A1 | 8/2010 | Choraku et al. | |

OTHER PUBLICATIONS

Office Action for U.S. Appl. No. 12/204,613, mailed Jan. 30, 2012, 6 pgs.

\* cited by examiner

SYSTEM, METHOD AND APPARATUS FOR DOOR LATCHING USING A SPRING LATCH

CROSS-REFERENCE TO RELATED APPLICATIONS

This application is a continuation of and claims priority from U.S. patent application Ser. No. 12/204,613, filed Sep. 4, 2008, now U.S. Pat. No. 8,226,131 entitled "SYSTEM, METHOD AND APPARATUS FOR DOOR LATCHING USING A SPRING LATCH," which claims priority from Provisional Application No. 60/967,420, filed Sep. 4, 2007, entitled "SYSTEM, METHOD AND APPARATUS FOR DOOR LATCHING USING A SPRING LATCH," which is hereby fully incorporated by reference herein. This application relates to U.S. patent application Ser. No. 12/204,579, filed Sep. 4, 2008, entitled "SYSTEM, METHOD AND APPARATUS FOR USING OVERMOLDED DAMPENERS TO ABSORB SHOCK AND VIBRATION," U.S. patent application Ser. No. 12/204,160, filed Sep. 4, 2008, entitled "SYSTEM, METHOD AND APPARATUS FOR DUAL HEATSINK COOLING SOLUTION FOR COMPUTERS," and U.S. patent application Ser. No. 12/204,586, filed Sep. 4, 2008, entitled "SYSTEM, METHOD AND APPARATUS FOR BATTERY COOLING AND PROTECTION," each of which is fully incorporated by reference herein.

TECHNICAL FIELD

This disclosure relates generally to providing physical protection to computers and, more particularly, to protecting computers from damage due to ingress of water or other contaminants.

BACKGROUND OF THE RELATED ART

Computers are susceptible to damage from liquids. Ingress of rain and other forms of precipitation can damage or ruin electronic components in a computer.

Gaskets are frequently used to provide a seal or barrier for liquids. A gasket is a mechanical seal that fills the space between two objects to prevent leakage between the two objects. However, gaskets generally rely on compression between two objects. If the compression has an angled or shear component, the gasket may roll or tear.

In laptop computers, there may be several doors that have living hinge mechanisms. The problem with living hinge doors is that, the living hinge may not withstand rugged environments and fails over time.

SUMMARY OF THE DISCLOSURE

A computer casing may have an opening that requires sealing against water ingress. Embodiments of a computer may have a door with a spring latch mechanism for inhibiting liquid ingress.

One embodiment of an apparatus for preventing ingress of liquid into a computer may be directed to computer door having a hinge for rotatable connection to a first side of a recessed opening in a computer casing, a closure mechanism for connection to a second side of a recessed opening in the computer casing, and a layer of material adhered to the inner surface of the door and having a chamfered edge. The closure mechanism may include a bar for movable connection to the door and operable for travel in a first direction or a second direction opposite the first direction, a latch mounted on the bar and oriented in a first direction, and a spring having a first end connected to the bar and a second end connected to the door for biasing the bar in the first direction. In some embodiments, closing the door causes the chamfered edge to contact a surface that is perpendicular to the layer of material and deflect the chamfered edge. Deflection of the chamfered edge may cause the layer of material to seal the opening.

In some embodiments, the latch comprises a first surface, wherein closing the door causes contact between the first surface of the latch and a locking element of the computer casing to bias the latch in the second direction, wherein continued closing of the door advances the first surface of the latch past the locking element, wherein the latch is free to move in the first direction. The layer of material may comprise natural butyl rubber and may have a thickness between 0.05 inches and 0.15 inches. In some embodiments, the bar is operable for slidable travel in the first direction or the second direction.

A system for preventing ingress of liquid into the opening may include a door rotatably connected to the computer casing, a layer of material adhered to the door and having a chamfered edge, a bar movably connected to the door and operable for travel in a first direction or a second direction opposite the first direction, and a spring having a first end connected to the bar and a second end connected to the door for biasing the bar in the first direction of travel. Closing the door causes the layer of material to contact a recessed surface of the opening and deflect the chamfered edge to form a seal in the recessed opening.

Sealing an opening from ingress of water, rain or other liquids through a recessed opening in the computer may involve sealing against an inner wall formed by the recessed opening. An advantage to sealing against an inner wall may be that the size of the recessed opening does not need to be enlarged or reduced and a door providing access to a component in the recessed opening may be flush with the surface of the computer. In some situations, the height or length of a surface of a computer may be restricted. In some situations, the size or arrangement of buttons, ports, or other features of a component in a recessed opening may be close to a recessed wall such that an o-ring would contact the feature. Embodiments of a door and a layer may enable a recessed opening to be sealed using an inner wall of the recessed opening, without contact against a component or features of a component in the recessed opening, and may also be flush with a surface of the computer casing.

Other objects and advantages of the embodiments disclosed herein will be better appreciated and understood when considered in conjunction with the following description and the accompanying drawings.

BRIEF DESCRIPTION OF THE DRAWINGS

A more complete understanding of the present disclosure and the advantages thereof may be acquired by referring to the following description, taken in conjunction with the accompanying drawings in which like reference numbers indicate like features and wherein.

DETAILED DESCRIPTION

The inventive system, method and apparatus for door latching using a spring latch and the various features and advantageous details thereof are explained more fully with reference to the non-limiting embodiments detailed in the following description. Descriptions of well known starting materials, manufacturing techniques, components and equipment are omitted so as not to unnecessarily obscure the disclosure in detail. Skilled artisans should understand, however, that the detailed description and the specific examples, while disclosing preferred embodiments of the disclosure, are given by way of illustration only and not by way of limitation. Various substitutions, modifications, and additions within the scope of the underlying inventive concept(s) will become apparent to those skilled in the art after reading this disclosure. Skilled artisans can also appreciate that the drawings disclosed herein are not necessarily drawn to scale.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements, but may include other elements not expressly listed or inherent to such process, article, or apparatus. Further, unless expressly stated to the contrary, "or" refers to an inclusive "or" and not to an exclusive "or". For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to a particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Embodiments described herein may be useful for constructing a rugged computer that can withstand harsh and extreme conditions. Computers, particularly laptop computers, are used by the military, commercial and individuals in situations in which the computer may be dropped, may encounter vibration for periods of time, may be exposed to rain, dust, salt water environments or high humidity environments, and the like.

Figure 1A:
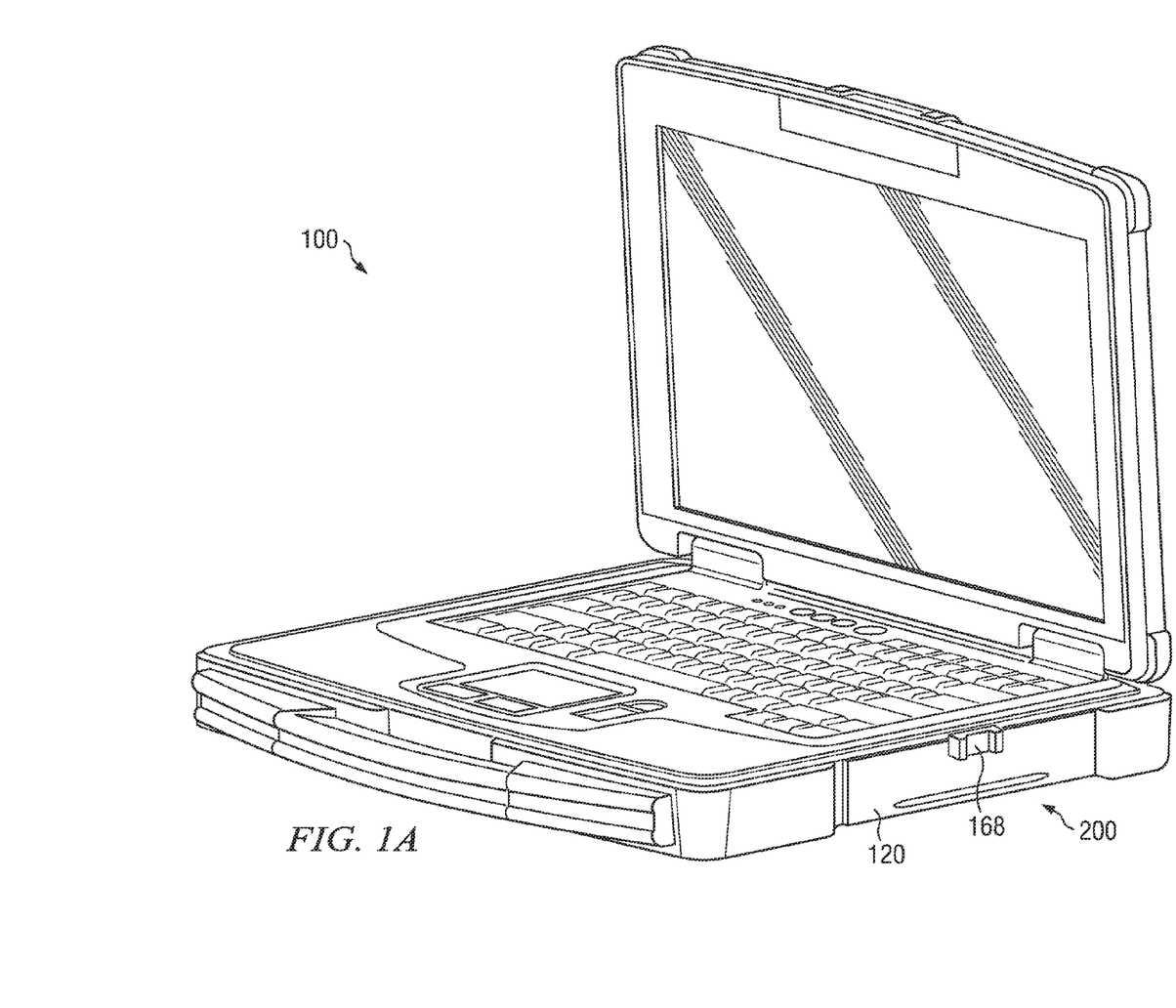
FIGS. 1A-1C depict perspective views of one embodiment of computer.
Figure 1B:
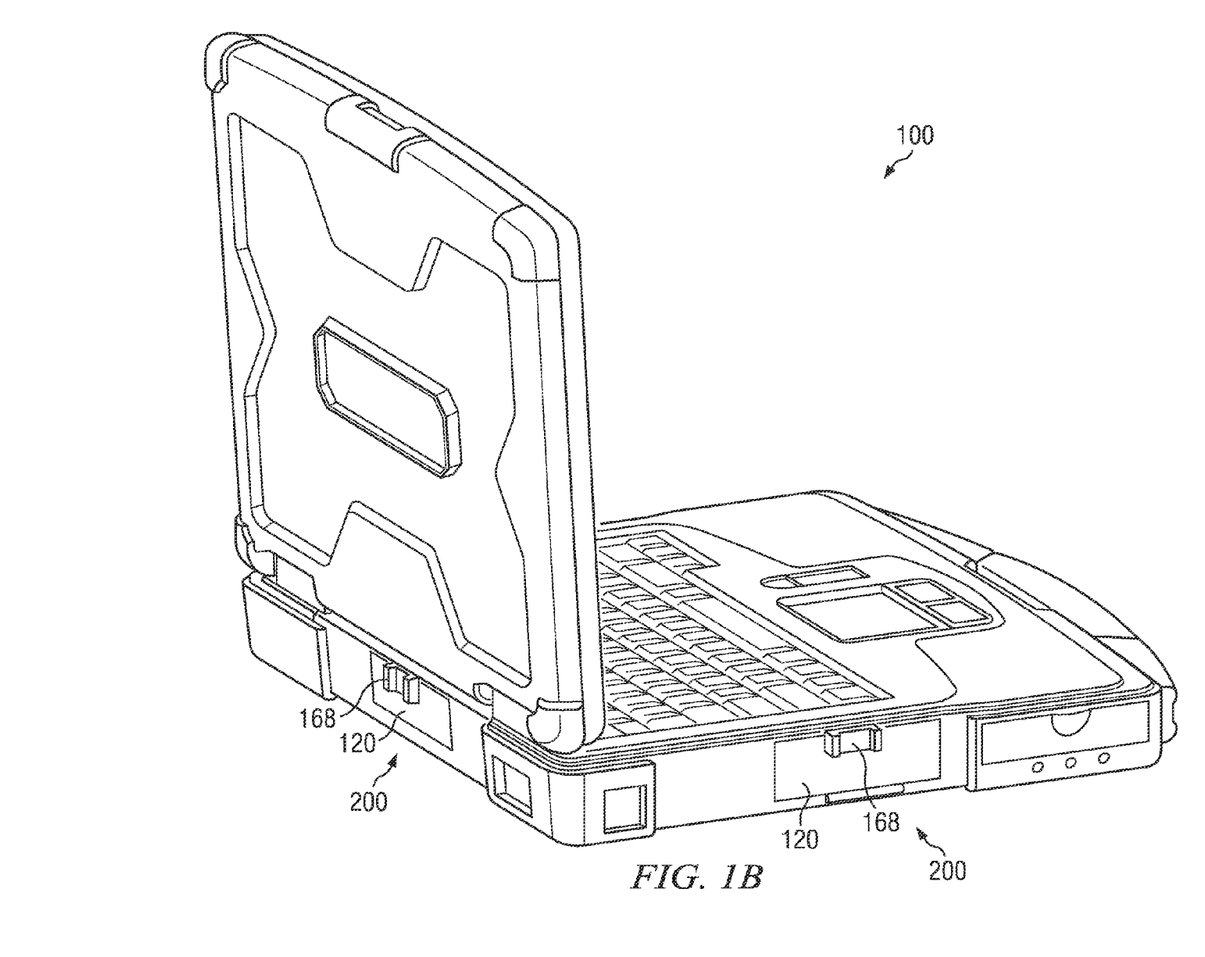
Figure 1C:
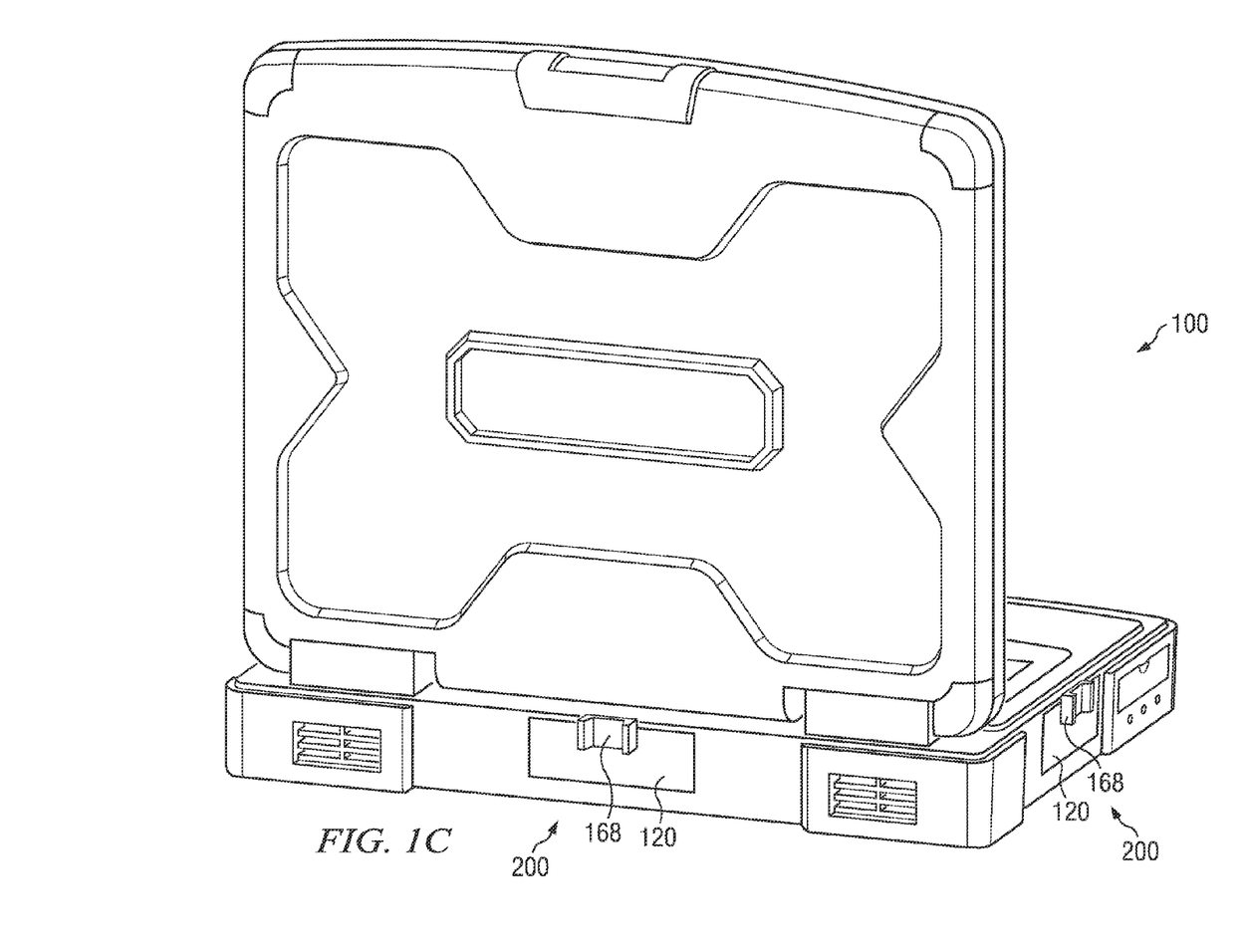

FIGS. 1A-1C depict perspective views of one embodiment of computer 100. DELL Computers, of Round Rock, Tex. is one example of a vendor of computer 100. Computer 100 may have a power port, WiFi port, a 1394 port, a PCMCIA slot, a Smart Card Reader slot, one or more USB ports, a media bay to support an optical storage medium (such as a CD-ROM), an RJ45 port, an RJ11 port, a serial communication port, a battery door or other openings 200 around the outside, through which water may ingress into computer 100. Although a laptop computer is shown, embodiments may be used with desktop computers, servers, handhelds, or other computers 100. Military standard MIL-STD 810F describes some performance standards regarding temperature, shock/drop, moisture, altitude and others to which computer 100 may be exposed.

Figure 2A:
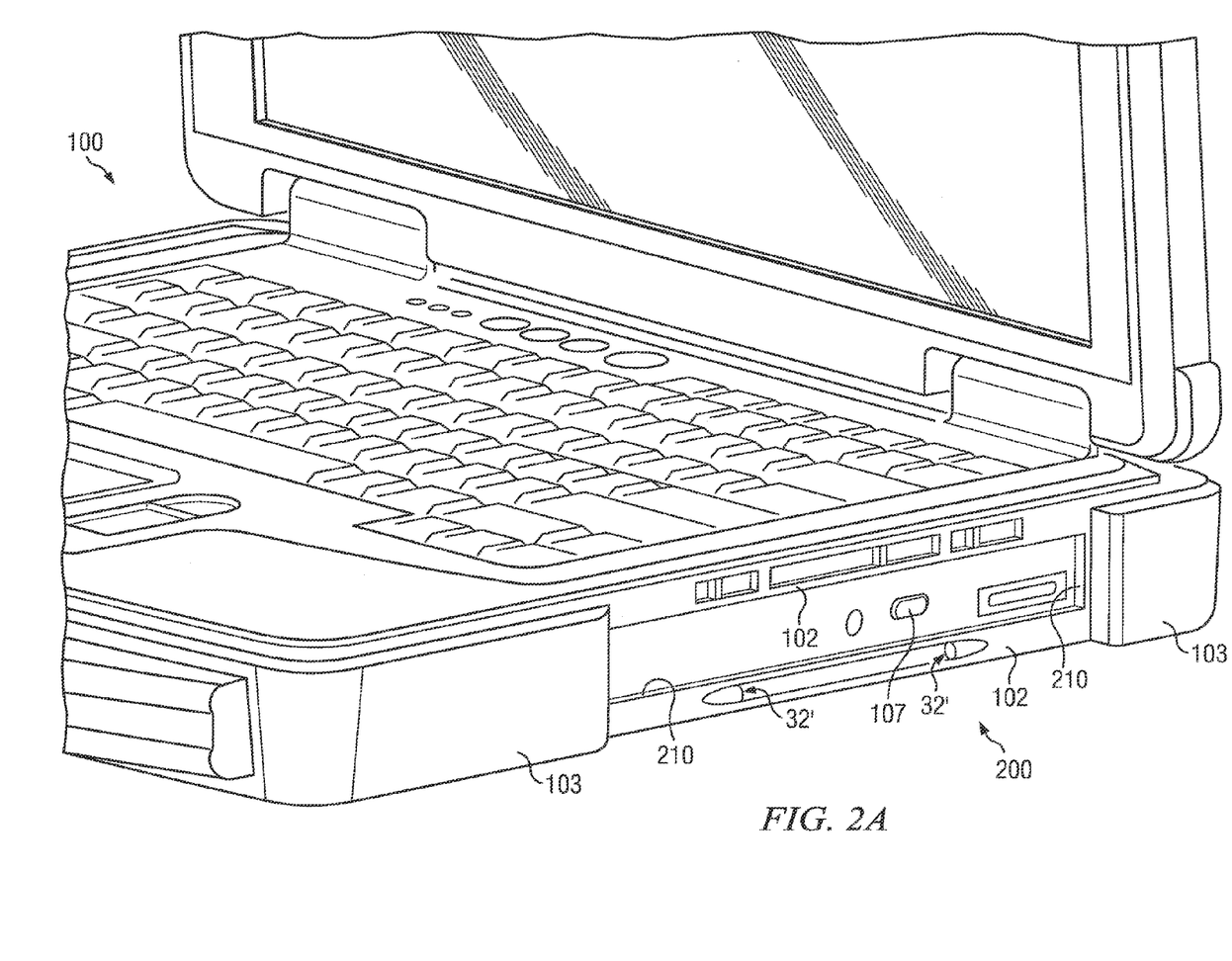
FIGS. 2A-2C depict views of a laptop having an opening 200 with inner walls recessing some depth from the surface.
Figure 2B:
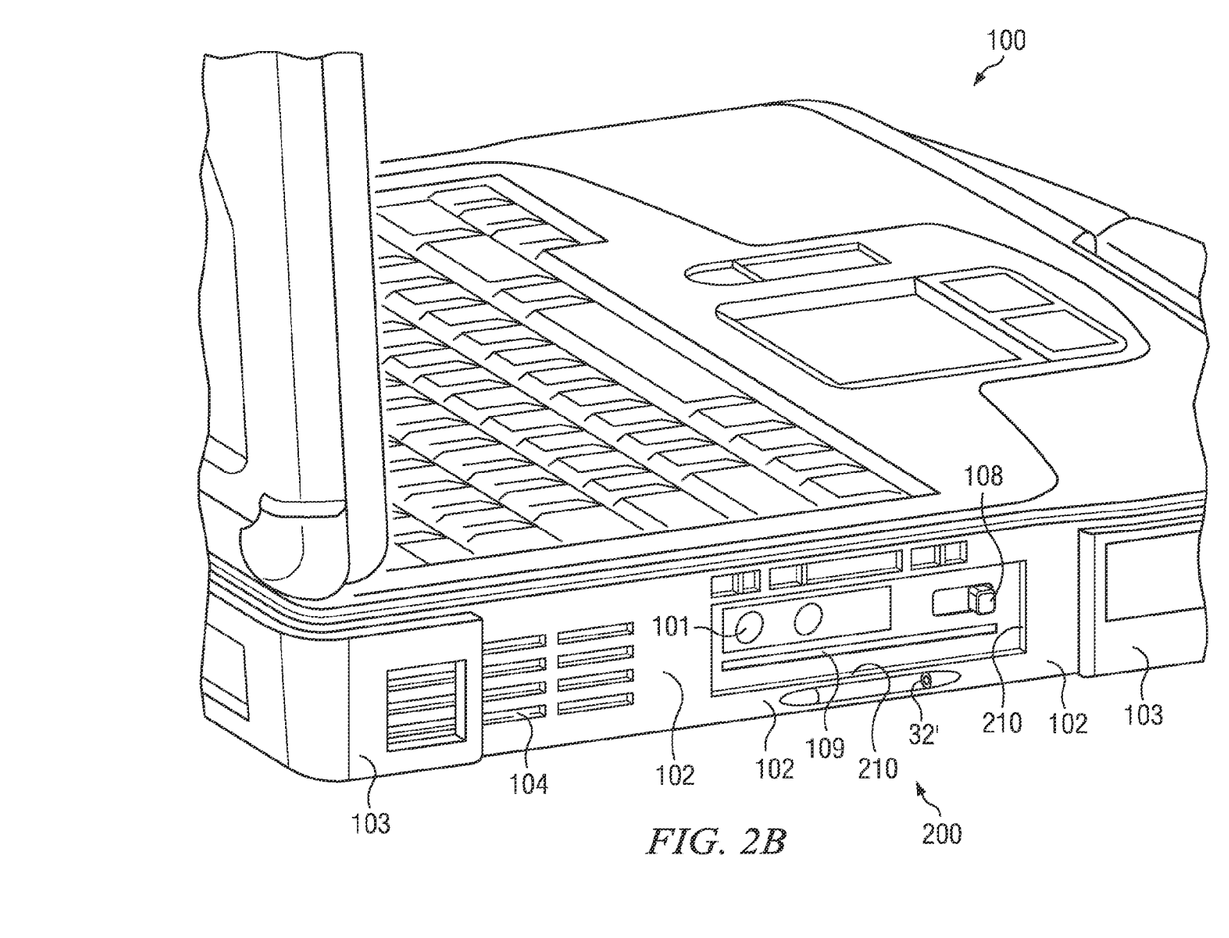
Figure 2C:
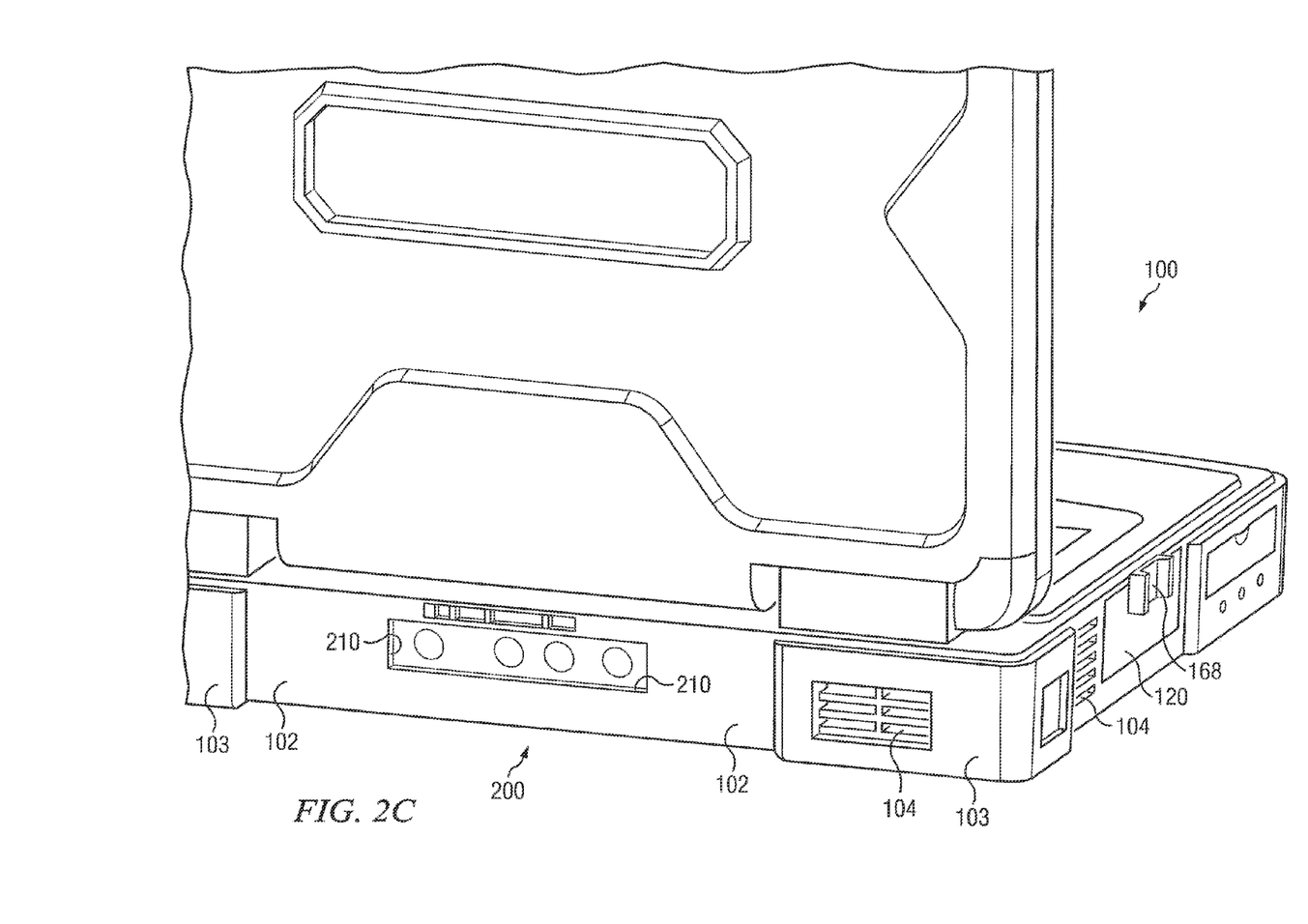

FIGS. 2A-2C depict views of laptop 100 having opening 200 with inner walls 210 recessing some depth from surface 102. The overall dimensions of computer 100 may determine the maximum size of opening 200. For example, a thinner computer 100 may restrict the height of opening 200, or the presence of nearby ports, shock dampeners 103 or vents 104 may determine the maximum width of opening 200 or the width of the surface around opening 200. U.S. Pat. No. 7,965,500 entitled "System, Method and Apparatus for Using Overmolded Dampeners to Absorb Shock and Vibration," which is hereby incorporated by reference, describes embodiments of shock dampeners 103 that may be positioned on computer 100 which may limit the maximum width of opening 200 or the surface area around opening 200.

In some embodiments, the area around opening 200 is too small for a gasket or o-ring. If the area surrounding the opening is narrow, the height and width or diameter of a gasket must also be small, which increases the risk that the gasket may roll or tear when closing door 120 over the opening. If a gasket is too thick, the gasket may add undesirable weight or door 120 for providing access to the opening may protrude an undesirable amount so that door 120 is no longer flush with the side of the computer.

As shown in FIGS. 2A-2C, a component such as DVD 104, AV-WiFi area 105, VGA area 106, or the like may be positioned in recessed opening 200 in laptop 100. The dimensions of a component installed in recessed opening 200 may determine the minimum width of opening 200. In some embodiments, a component may have buttons 107, switches 108, slots 109 or ports 101 such that it is undesirable to apply pressure to the component surface. In some embodiments, the shape or size of a component may be such that the face of the component is recessed some distance from surface 102 of laptop 100, thereby forming inner walls 210.

Figure 3A:
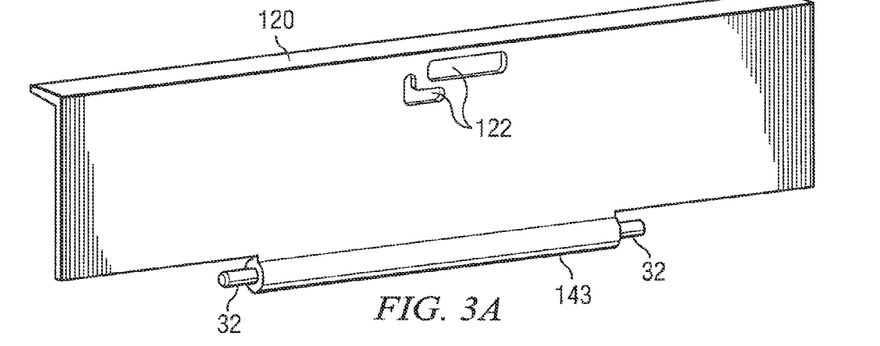
FIGS. 3A-3C depict perspective views of a door with a portion of a hinge.
Figure 3B:
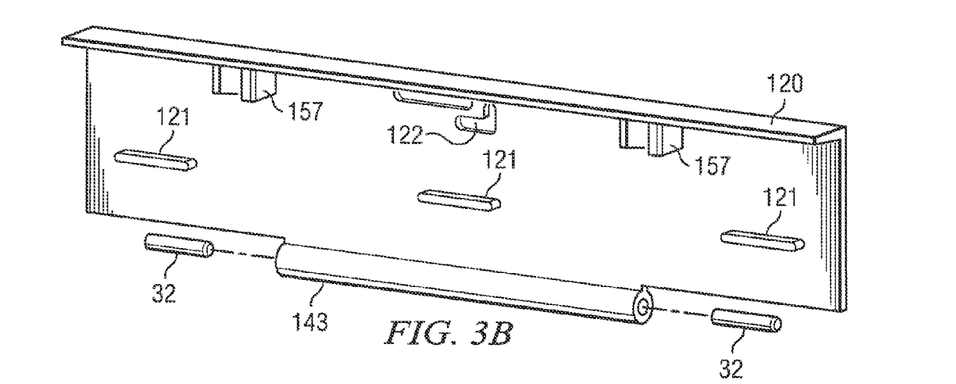
Figure 3C:
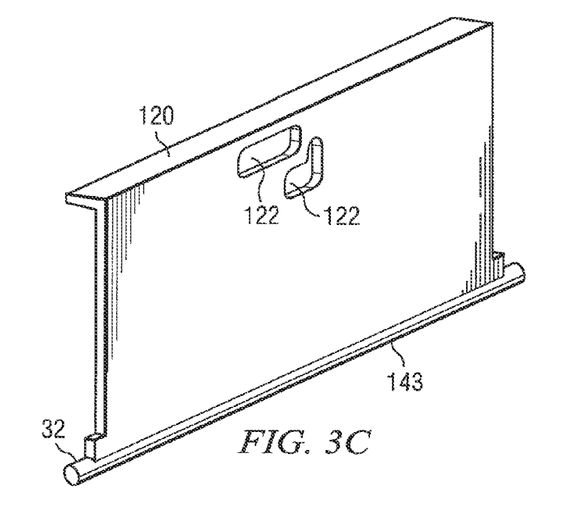

FIGS. 3A-3C depict perspective views of door 120 with portions of hinge 143. In some embodiments, such as depicted in FIGS. 3A and 3B, door 120 may have hinge having pins 32 manufactured separately and then connected to door 120. In some embodiments, such as FIG. 3C, pins 32 may be integral to door 120. Door 120 may also include locking elements 157 for engagement by a latch, and opening 122, which may provide access for a lock, discussed below. Door 120 may be manufactured from any lightweight rigid material. In some embodiments, door 120 may be manufactured from a zinc alloy or a magnesium alloy such that door 120 is rigid but adds very little to the overall weight of computer 100. Door 120 may include protrusions 121 to assist with positioning or alignment of layer 150, discussed below.

Figure 4A:
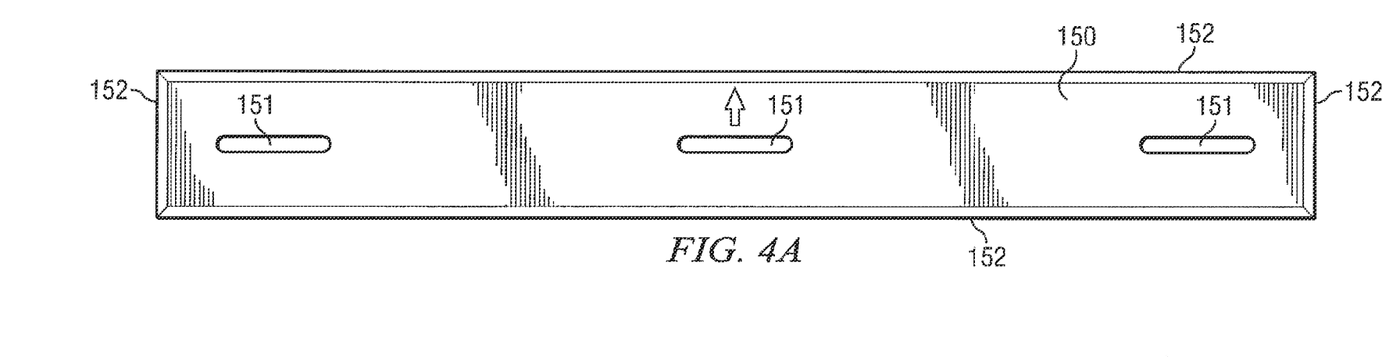
FIGS. 4A and 4B depict side views of a layer of a resilient material for adhering to a door.
Figure 4B:
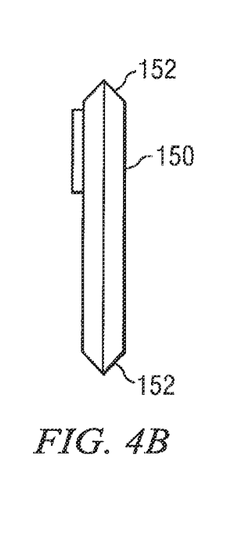

FIGS. 4A and 4B depict side views of layer 150 of a resilient material for adhering to door 120. Layer 150 may be manufactured from any resilient material that allows layer 150 to seal against inner surface 210 of opening 200. In one embodiment, a resilient material comprises natural butyl rubber (NBR). In some embodiments, layer 150 may be manufactured from Dynaflex G7930-9001-02 TPE, hardness 30 Shore A. In some embodiments, layer 150 may be manufactured from Versa Flex CL2003X Ultra-Soft TPE, hardness 30 Shore 00. In some embodiments, layer 150 having a thickness of 0.10 inches may inhibit ingress of water or other liquids in computer 100.

Layer 150 may be thermally, mechanically or chemically adhered to door 120. In some embodiments, layer 150 having an adhesive backing may be adhered to door 120. In some embodiments, adhesive used to mate layer 150 to door 120 may be 3M 467®. 3M 467 is manufactured by The 3M Company, St. Paul, Minn. When door 120 is in a closed configuration, layer 150 may form a seal against inner walls 210 inside opening 200 to inhibit water or other liquids from seeping, flowing, or otherwise entering computer 100 through opening 200. In some embodiments, contact between layer 150 and inner surface 210 of opening 200 may create a seal to inhibit ingress of liquids into computer 100.

Figure 5A:
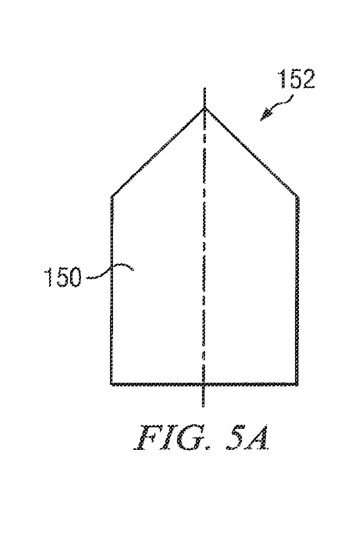
FIGS. 5A and 5B depict side views of one embodiment of the layer of material in FIGS. 4A and 4B having a chamfered edge.
Figure 5B:
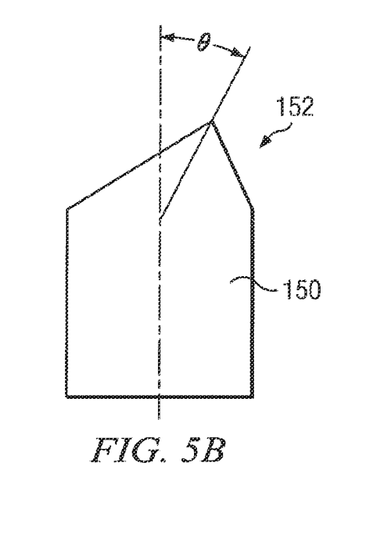

In some embodiments, layer 150 may include chamfered edge 152 to provide a seal against inner surface 210. Chamfered edge 152 may refer to a continuous edge around the perimeter of layer 150 or may refer to the combined edges of two or more sides of layer 150. In some embodiments, layer 150 may have chamfered edge 152 extending around four sides with radiused corners. In some embodiments, chamfered edge 152 may be formed such that, when door 120 is closing, chamfered edge 152 contacts inner wall 210 to cause chamfered edge 152 to deflect by some angle, which may be referred to as a lag angle. FIGS. 5A and 5B depict side views of one embodiment of layer 150 having chamfered edges 152. In FIG. 5A, chamfered edge 152 is shown in an undeflected state. In FIG. 5B, layer 150 is shown with chamfered edge 152 in a deflected state with an associated angle θ (theta). The chamfer angle of chamfered edge 152 and the material used to form layer 150 may determine the angle θ (theta) to which chamfered edge 152 may deflect.

If the chamfer angle of chamfered edge 152 is too small, layer 150 may not form a proper seal and liquid may bypass layer 150. If the chamfer angle of chamfered edge 152 is too large, layer 150 may overcompress. Overcompression may result in excess material such that layer 150 does not seal properly or door 120 may be unable to close such that liquid may bypass layer 150. Over time, overcompression may lead to tearing, cracking, deformation, or some other material failure of layer 150, which may allow liquid to bypass layer 150 and enter computer casing 20. In some embodiments, the chamfer angle may be between 40 and 50 degrees.

Layer 150 may provide other advantages as well. An advantage of layer 150 having chamfered edge 152 may occur when chamfered edge 152 contacts inner surface 210 of opening 200. In some embodiments, the chamfer angle of chamfered edge 152 may be selected such that a desired resistive friction force is generated during closure of door 120. The friction force may resist closure of door 120 such that closure of door 120 is assured only when a desired force is applied. If a user of computer 100 is wearing gloves, or visibility is poor, or the computer is in a noisy environment, a tactile sensation provided by door 120 may be a reliable indicator when door 120 is closed to inhibit ingress of liquid.

Another advantage of layer 150 may be the minimal thickness required to form a good seal. In some embodiments, layer 150 configured to inhibit water ingress based on a 40 psi/4 inches per hour standard may be between 0.2 mm and 0.4 mm thick. The minimal thickness and/or lack of a groove to retain layer 150 may result in lower overall weight of door 120, and less manufacturing complexity and cost. For example, layer 150 may have openings 151 at various locations to accommodate features 121 of door 120. Positioning openings 151 on features 121 may be easier than positioning an o-ring in a groove or a gasket on an edge.

Figure 6A:
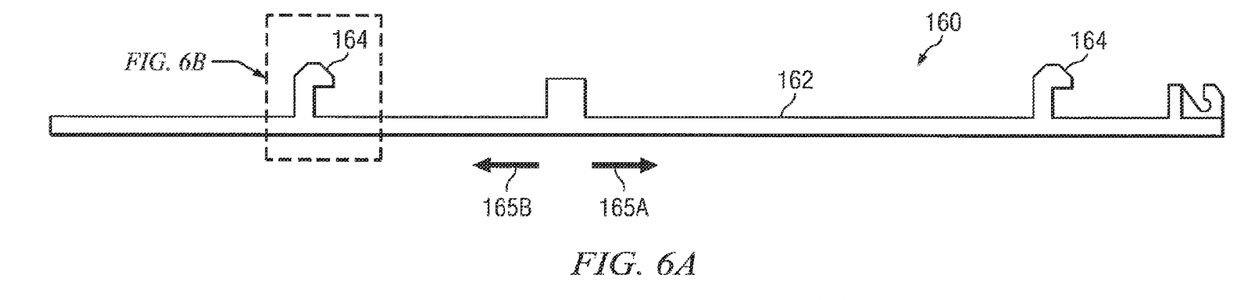
FIGS. 6A and 6B depict views of a portion of one embodiment of a closure mechanism.

FIG. 6 depicts a perspective view of a portion of one embodiment of closure mechanism 160. Closure mechanism 160 positioned on computer 100 may connect to door 120 to ensure a seal between layer 150 and inner surface 210 remains intact even in extreme conditions. In some embodiments, closure mechanism 160 may ensure water with a pressure of 40 psi and a flow rate of 4 inches per hour does not enter computer 100.

Closure mechanism 160 may include bar 162 having latches 164. In some embodiments, bar 162 may be operable to travel in a first direction as indicated by arrow 165A and a second direction opposite the first direction as indicated by arrow 165B (i.e., bidirectional movement). A spring may apply a force to bar 162 to bias bar 162 in the first direction. Biasing bar 162 in the first direction may provide for automatic locking of closure mechanism 160. In some embodiments, closure mechanism 160 may include a thumb slide 168.

In some embodiments, closure mechanism 160 may automatically engage door 120 to inhibit ingress of water or other liquids. In some embodiments, bar 162 of closure mechanism 160 may move in response to contact with locking element 157 of door 120 such that latch 164 automatically engages locking element 157. In one embodiment, closing door 120 may cause contact between latch 164 and locking element 157. Contact between latch 164 and locking element 157 may bias or otherwise cause latch 164 to move in second direction 165B. As door 120 closes, latch 164 may pass by locking element 157 such that locking element 157 no longer biases latch 164 in the second direction and latch 164 is free to move in the first direction. Latch 164 moving in the first direction may engage locking element 157. As door 120 closes, layer 150 may form a seal against inner surface 210 such that when latch 164 engages locking element 157, layer 150 inhibits ingress of water through opening 200.

Figure 6B:
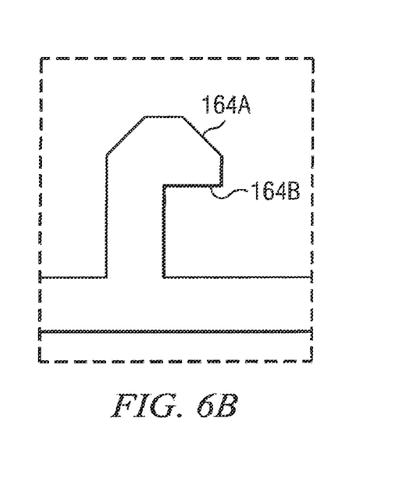

FIG. 6B depicts a close up view of a portion of closure mechanism 160. Latch 164 may have first surface 164A and second surface 164B to enable automatic latching of door 120. In one embodiment, as door 120 is closing, first surface 164A of latch 164 contacts a surface of locking element 157. As latch 164 passes by locking element 157, latch 164 may move in the second direction, causing bar 162 to move in the second direction as well. As door 120 is closed further, bar 162 and latch 164 may be biased in the second direction such that latch 164 is able to pass by locking element 157. As latch 164 passes by locking element 157, first surface 164A of latch 164 may no longer contact a first surface of locking element 157 and latch 164 may be free to move in the first direction. As latch 164 moves past locking element 157, latch 164 may move in the first direction to engage locking element 157. In some embodiment, first surface 164A of latch 164 may engage a similar shaped or textured surface of locking element 157.

Figure 7:
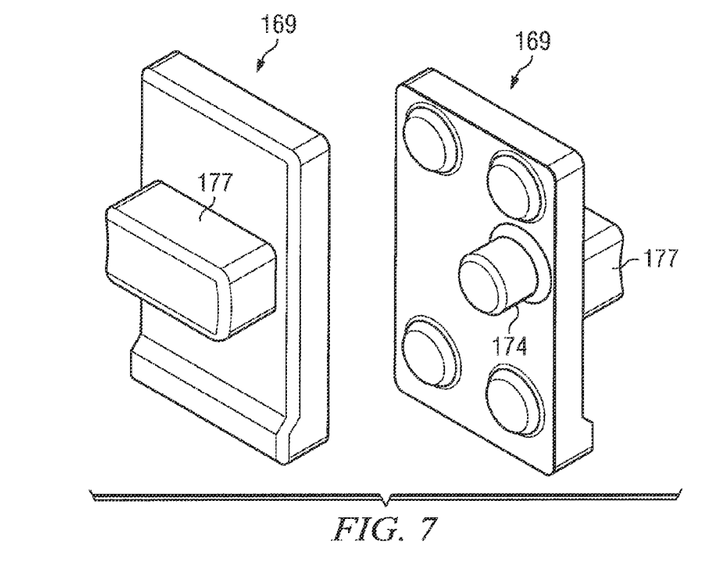
FIG. 7 depicts views of one embodiment of a lock.

FIG. 7 depicts views of one embodiment of lock 169. Lock 169 may prevent latch 164 from disengaging from locking element 157 to ensure door 120 remains closed. In some embodiments, a person may move lock 169 by moving contact point 177 on the outside of door 120 to bias protrusion 174 extending through opening 122 to the inside of door 120.

Figure 8:
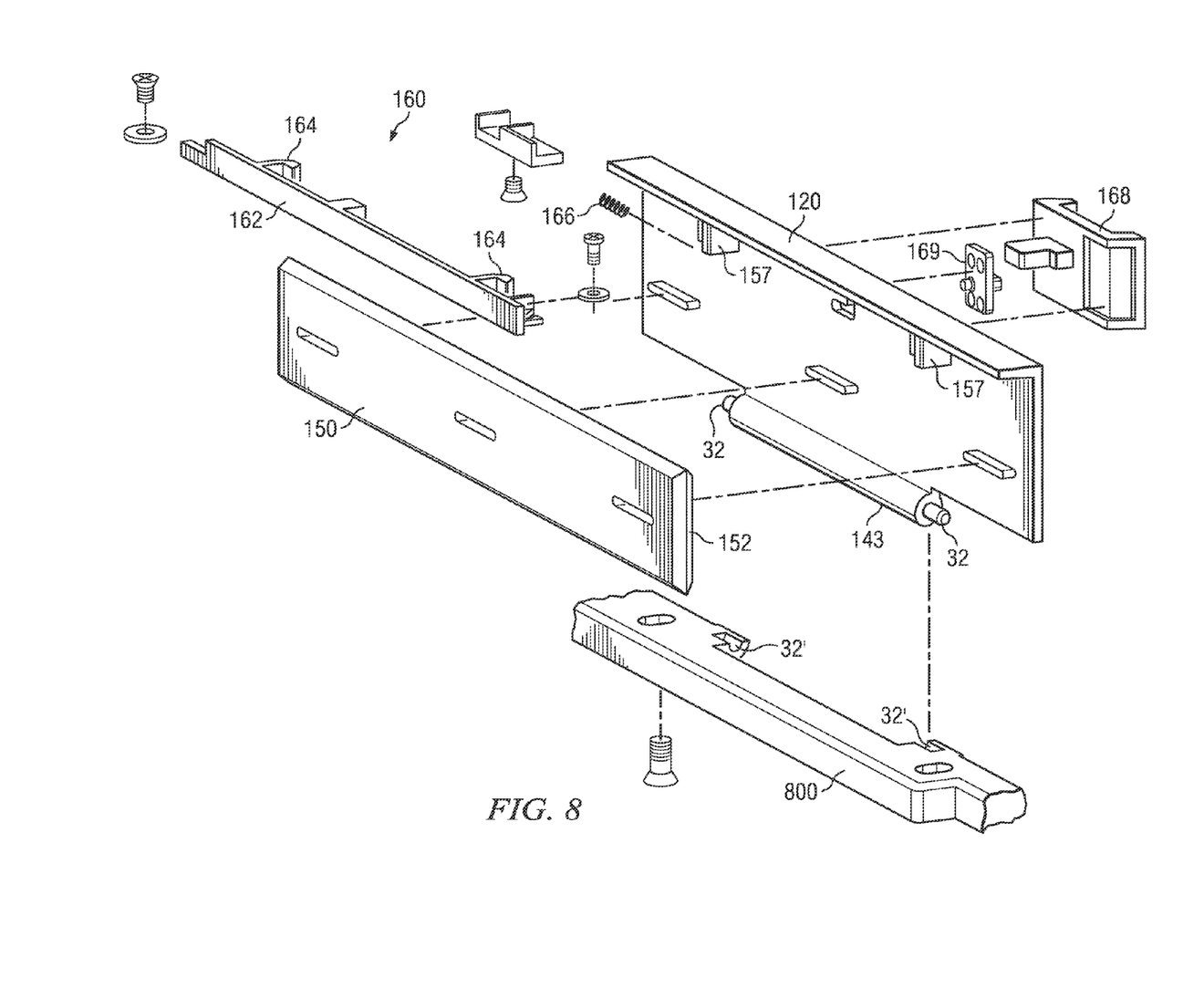
FIG. 8 depicts an exploded view of one embodiment of a door latching system using a spring latch.

FIG. 8 depicts an exploded view of a door latching system, which may include door 120 connected by hinge 143 and pins 32 to a portion 800 of computer 100, layer 150 having chamfered edge 152 for contact with inner walls 210 of openings 200 in computer 100, and closure mechanism 160 having latches 164 for engaging locking elements 157 on door 120.

In some embodiments, a door latching mechanism may include spring 166. Spring 166 may provide a spring force to bar 162 sufficient to bias bar 162 in the first direction. Spring 166 may be a compression, tension, or torsion spring. The spring constant, wire diameter, mean coil diameter, number of coils, initial tension, and maximum deflection for spring 166 may be selected to ensure door 120 remains closed and water at a pressure standard of 40 psi and a flow standard of 4 inches per hour is inhibited from entering opening 200. In one embodiment, spring 166 may be a tension spring with a spring constant between 3.5 lbs/inch and 4.0 lbs/inch. The friction force between second surface 164B of latch 164 and second surface 157B of locking element 157 or the force exerted by spring 166 on bar 162 may ensure latch 164 remains engaged to locking element 157. When latch 164 is engaged with locking element 157, door 120 may be inhibited from opening and the seal between layer 150 and inner surface 210 may be maintained. In some embodiments, a seal between layer 150 and inner surface 210 that inhibits liquid ingress up to 40 psi at 4 inches per hour may be maintained by door 120 having latch 164 engaging locking element 157.

In order for door 120 to be opened, closure mechanism 160 may include a release mechanism. In one embodiment, a release mechanism may involve biasing bar 162 in the second direction such that latch 164 disengages from second surface 157B of locking element 157. Biasing bar 162 in the second direction may involve overcoming the spring force generated by spring 166. Biasing bar 162 in the second direction may involve pulling on a component, pushing on a component, or rotating a component to overcome the spring force generated by spring 166. For example, closure mechanism 160 may include thumb slide 168 connected to bar 162. A user may slide thumb slide 168 in the second direction to bias bar 162 such that latch 164 disengages from locking element 157.

A release mechanism may assist with opening door 120 in addition to disengaging latch 164 from locking element 157. In one embodiment, biasing bar 162 in a second direction may cause contact between latch 164 and a second portion of locking element 157 to bias door 120 away from locking element 157.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer door system comprising:
    a door of a rigid material, the door comprising:
        a first edge;
        a second edge opposite the first edge;
        a hinge proximate the first edge of the door and configured to rotatably connect the first edge of the door to a first side of a recessed opening in a computer casing;
        locking elements proximate the second edge of the door;
        a closure mechanism proximate a second side of the recessed opening in the computer casing and configured for engagement with the locking elements of the door proximate the second edge of the door;
        a plurality of protrusions on the inner surface of the door;
    a sheet of resilient material, comprising:
        a plurality of openings in the sheet of resilient material corresponding to the plurality of protrusions on the inner surface of the door;
        a first chamfered edge for contact with a first inner wall of the recessed opening in the computer casing, the first chamfered edge being deflectable;
        a second chamfered edge for contact with a second inner wall of the recessed opening in the computer casing, the second chamfered edge being deflectable; and
        a first side between the first chamfered edge and the second chamfered edge and configured to adhere to an inner surface of the door,
    wherein the first chamfered edge and the second chamfered edge of the sheet of resilient material are configured to form a seal between the sheet of resilient material and the first and second inner walls of the recessed opening in the computer casing when the door is closed.

2. The computer door system of claim 1, wherein the sheet of resilient material comprises natural butyl rubber.

3. The computer door system of claim 1, wherein the sheet of resilient material has a thickness between 0.05 inches and 0.15 inches.

4. The computer door system of claim 1, wherein closing the door causes the bar of the closure mechanism to move in response to contact with a locking element of the door such that a latch of the closure mechanism on the second side of the recessed opening in the computer casing automatically engages the locking element of the door to lock the door.

5. The computer door system of claim 1, wherein the chamfered edge of the sheet of resilient material extends substantially around the perimeter of the sheet of resilient material.

6. The computer door system of claim 1, further comprising a thumb slide connected to the bar, wherein biasing the thumb slide biases the bar in the first direction or the second direction.

7. The computer door system of claim 1, wherein the chamfer angle is between 40-50 degrees.

8. A computer casing having a system for preventing ingress of liquid into an opening in the computer casing, comprising:
    a bar positioned on a first wall of a recessed opening in a computer casing and operable for travel in a first direction or a second direction opposite the first direction;
    a spring having a first end connected to the bar and a second end connected to the computer casing for biasing the bar in the first direction of travel;
    a door comprising:
        a plurality of protrusions on the inner surface of the door;
        a hinge proximate a first edge for connecting the door to a second wall of the recessed opening in the computer casing;
        a layer of material adhered to the door with a plurality of openings corresponding to the plurality of protrusions and having a chamfered edge for contact with a wall in the recessed opening, wherein the hinge is configured to rotatably connect the door to the side of the recessed opening, wherein the layer of material is configured to contact a wall of the recessed opening and deflect the chamfered edge, wherein deflection of the chamfered edge forms a seal in the recessed opening; and
        a locking element proximate a second edge, wherein the locking element is configured to contact the bar when the door is closing to exert a force on the bar in the second direction that is greater than the force exerted by the spring in the first direction to bias the bar in the second direction, and further configured to allow the spring to bias the bar in the first direction when the door is closed to engage the bar with the locking element.

9. The computer casing of claim 8, wherein the layer of material comprises natural butyl rubber.

10. The computer casing of claim 8, further comprising a thumb slide connected to the bar, wherein biasing the thumb slide biases the bar in the first direction or the second direction.

11. The computer casing of claim 8, wherein the chamfer angle is between 40-50 degrees.

12. The computer casing of claim 8, wherein the layer of material has a thickness between 0.05 inches and 0.15 inches.

13. A method, comprising:
   movably connecting a bar to a computer casing, wherein the bar is operable for travel in a first direction or a second direction opposite the first direction;
   connecting a first end of a spring to the bar and connecting a second end of the spring to the computer casing for biasing the bar in the first direction of travel;
   forming a door sized for positioning in a recessed opening in the computer casing;
   adhering a layer of material having a chamfered edge to the door;
   aligning a plurality of openings in the layer of material with a plurality of protrusions on an inner surface of the door; and
   positioning the door in the recessed opening of the casing, wherein the hinge is configured to rotatably connect the door to a wall of the recessed opening,
   wherein closing the door causes the layer of material to contact a wall in the recessed opening and deflect the chamfered edge, wherein deflection of the chamfered edge forms a seal in the recessed opening, and
   wherein closing the door contacts a surface of the bar against the locking element on the door to exert a force on the bar in the second direction that is greater than the force exerted by the spring in the first direction to bias the bar and the bar in the second direction, once the bar has passed the locking element, the spring biasing the bar in the first direction to engage the bar with the locking element.

14. The method of claim 13, wherein the layer of material has a thickness between 0.05 inches and 0.15 inches.

15. The method of claim 13, wherein the chamfer angle is between 40-50 degrees.

* * * * *